(12) United States Patent
Medhurst

(10) Patent No.: US 10,766,456 B2
(45) Date of Patent: Sep. 8, 2020

(54) POWERED MOBILITY VEHICLE

(71) Applicant: Neil Thomas Medhurst, Dartford (GB)

(72) Inventor: Neil Thomas Medhurst, Dartford (GB)

( * ) Notice: Subject to any disclaimer, the term of this patent is extended or adjusted under 35 U.S.C. 154(b) by 49 days.

(21) Appl. No.: 15/846,420

(22) Filed: Dec. 19, 2017

(65) Prior Publication Data
US 2018/0170310 A1 Jun. 21, 2018

(30) Foreign Application Priority Data
Dec. 19, 2016 (GB) .................................. 1621658.2

(51) Int. Cl.
B60R 25/20 (2013.01)
G07C 9/00 (2020.01)
B60L 3/02 (2006.01)
B60R 25/045 (2013.01)
A61G 5/04 (2013.01)
B62K 5/007 (2013.01)
A61G 5/10 (2006.01)

(52) U.S. Cl.
CPC .............. B60R 25/209 (2013.01); A61G 5/04 (2013.01); A61G 5/10 (2013.01); B60L 3/02 (2013.01); B60R 25/045 (2013.01); B62K 5/007 (2013.01); G07C 9/00309 (2013.01); B60L 2200/24 (2013.01); G07C 2009/00634 (2013.01); Y02T 90/16 (2013.01)

(58) Field of Classification Search
CPC ....... B60R 25/209; B60R 25/045; A61G 5/04; A61G 5/10; B62K 5/007; B60L 3/02; B60L 2200/24; G07C 9/00309; G07C 2009/00634; Y02T 90/16
See application file for complete search history.

(56) References Cited

U.S. PATENT DOCUMENTS 4,785,291 A * 11/1988 Hawthorne ........ G08B 21/0247
340/539.1
5,874,785 A * 2/1999 Liu .......................... B60R 25/04
123/179.2
6,812,829 B1 * 11/2004 Flick ....................... B60R 16/03
180/287

(Continued)

FOREIGN PATENT DOCUMENTS

JP 2003072518 3/2003
WO 2015103204 7/2015

Primary Examiner — Darlene P Condra
(74) Attorney, Agent, or Firm — Haugen Law Firm PLLP

(57) ABSTRACT

A powered mobility vehicle including a keyless activation system, wherein the keyless activation system includes a control module carried by the vehicle and a remote operation transmitter, wherein the control module includes an electrical input which is connected to the electrical power supply of the vehicle, an electrical output connected to a motor controller of the vehicle, a switch electrically connected between the electrical input and the electrical output, and a signal receiver electrically connected to the switch, wherein the switch has an active configuration in which electrical power is supplied to the electrical output from the electrical input via the switch and an inactive configuration in which the switch electrically isolates the electrical output from the electrical input, and the configuration of the switch is controlled by signals from the signal receiver; and wherein the transmitter communicates wirelessly with the signal receiver.

12 Claims, 2 Drawing Sheets

(56) References Cited

U.S. PATENT DOCUMENTS

| | | | | |
|---|---|---|---|---|
| 7,344,430 B2* | 3/2008 | Hasty | ............... | A63H 17/395 180/167 |
| 8,264,320 B2* | 9/2012 | Nelson | ............... | B60R 25/24 340/5.2 |
| 2003/0174085 A1* | 9/2003 | Gavish | ............... | A63G 25/00 341/176 |
| 2004/0251744 A1* | 12/2004 | Egawa | ............... | B60R 25/04 307/10.1 |
| 2005/0202752 A1* | 9/2005 | Bryner | ............... | A63G 25/00 446/465 |
| 2006/0087405 A1 | 4/2006 | Koike et al. | | |
| 2007/0034433 A1* | 2/2007 | Gabriele | ............ | A63H 30/04 180/167 |
| 2007/0262642 A1* | 11/2007 | Brown, Jr. | ......... | B60R 25/045 307/10.6 |
| 2008/0117079 A1 | 5/2008 | Hassan | | |
| 2011/0132680 A1 | 6/2011 | Yamamura et al. | | |
| 2011/0291797 A1* | 12/2011 | Tessier | ............... | B60R 25/04 340/5.61 |
| 2015/0029010 A1* | 1/2015 | Wisnia | ............... | G08C 17/02 340/426.17 |
| 2016/0001741 A1* | 1/2016 | Fazi | ............... | B60R 25/209 701/2 |
| 2016/0300417 A1* | 10/2016 | Hatton | ............ | G07C 9/00857 |
| 2016/0325710 A1* | 11/2016 | Honkanen | ......... | B60R 25/2081 |
| 2016/0344101 A1 | 11/2016 | Ghabra et al. | | |
| 2017/0249792 A1* | 8/2017 | Gennermann | ......... | B60R 25/24 |
| 2017/0249794 A1* | 8/2017 | Davis | ............ | H04L 63/0861 |
| 2017/0352215 A1* | 12/2017 | Maiwand | ......... | G07C 9/00896 |

\* cited by examiner

POWERED MOBILITY VEHICLE

BACKGROUND OF THE INVENTION

The present invention relates to powered mobility vehicles, such as electric mobility scooters and electric wheelchairs, in which a conventional key system may be replaced with a remotely operated control module or a remotely operated control module may be fitted to the vehicle.

Powered mobility vehicles, such as electric mobility scooters and electric wheelchairs typically have a simple key-activated power system, such as a control system for the electric. However, the keys of such vehicles tend to be very unsophisticated and often manufacturers use a common key system such that any key is able to activate a number of vehicles within a given range of vehicles, sometimes even all of the vehicles within that range. This makes the vehicles easy to steal. Furthermore, an exposed key-operated lock is relatively easy to circumvent, which also makes the vehicle vulnerable to theft. Alternatively, certain powered mobility vehicles have no key-activated power systems and can simply be operated with no need for a key.

In addition to the security issues, users of mobility vehicles often have limited movement of their fingers, which makes operating a key difficult. Moreover, it is often difficult for certain users of mobility vehicles to coordinate locating the key in the lock and it is known for keys to be broken whilst in the lock, which can cause the vehicle to be stuck in the active or inactive configuration.

Furthermore, should a user become incapacitated whilst operating the vehicle, it is difficult to bring the vehicle safely to a stop if the vehicle uses a key-operated activation system.

Thus, conventional key-operated mobility vehicles are relatively easy to steal, can be difficult to operate and can pose a safety risk should the user become incapacitated while operating the vehicle.

SUMMARY OF THE INVENTION

According to a first aspect of the invention, there is provided a powered mobility vehicle including a keyless activation system, wherein the keyless activation system includes a control module carried by the vehicle and a remote operation transmitter, wherein the control module includes an electrical input which is connected to the electrical power supply of the vehicle, an electrical output connected to a motor controller of the vehicle, a switch electrically connected between the electrical input and the electrical output, and a signal receiver electrically connected to the switch, wherein the switch has an active configuration in which electrical power is supplied to the electrical output from the electrical input via the switch and an inactive configuration in which the switch electrically isolates the electrical output from the electrical input, and the configuration of the switch is controlled by signals from the signal receiver; and wherein the transmitter communicates wirelessly with the signal receiver.

It will be appreciated that the keyless activation system replaces the conventional key-operated power system or adds an activation system to a vehicle. Such a system makes it more difficult to steal the vehicle, as the remote operation transmitter may be paired with the signal receiver of the control module such that only the unique transmitter which is paired to the control module is able to activate the vehicle. In certain embodiments, the transmitter transmits a coded signal and the signal receiver detects if the received signal includes the correct code. The signal receiver will only activate the vehicle if the correct code is received.

Furthermore, the remote operation transmitter is easier for a user to operate, as it may require a simple press of a button, which may be relatively large and easy to press, or it may simply need to be within a pre-defined distance from the signal receiver, such that no further operation of the transmitter is required.

Additionally, the transmitter may be in possession of a carer or supervisor, such that the vehicle may be remotely deactivated or shut-off in the event of the user becoming incapacitated.

The transmitter suitably transmits an activation signal and the switch is configured in the active configuration in response to the activation signal.

As noted above, the transmitter may transmit a coded signal and the signal receiver may detect the coded signal and determine if the transmitter is an authorised transmitter. Thus, the signal receiver may compare the received code with a database which stores one or more authorised codes.

In an embodiment of the invention, the powered mobility vehicle includes a visual indicator connected to the electrical output of the control module and the visual indicator indicates the configuration of the switch. The visual indicator may be a light emitting element, such as an LED, which is configured to emit a light when the switch is in the active configuration.

The remote operation transmitter may include at least one button that is pushed by a user to transmit an activation signal to the signal receiver. Thus, a physical operation by the user is required to activate the electrical power system of the vehicle. The remote operation transmitter may further include at least one second button that transmits a deactivation signal and the signal receiver configures the switch in the inactive configuration in response to the deactivation signal.

Alternatively, the transmitter may operate on a proximity principle. In such an embodiment, the transmitter includes a radio transponder which transmits an activation signal and which is paired with the signal receiver such that when transmitter is less than a pre-defined distance from the signal receiver, the signal receiver detects the activation signal transmitted by the transmitter and configures the switch in the active configuration in response to the transmitted activation signal. In such an embodiment, no physical operation of the transmitter is required. The user simply has to be close enough to the vehicle with the transmitter for the vehicle's electrical power system to be activated.

In such an embodiment, the radio transponder may transmit the activation signal in response to a pairing signal emitted by the signal receiver.

The powered mobility vehicle may be an electrically operated mobility vehicle, such as an electric mobility scooter or an electrically powered wheelchair.

According to a second aspect of the invention, there is provided a method of installing a keyless activation system in a powered mobility vehicle including a key-operated electrical power system having an electrical connection to the electrical power supply of the vehicle and an electrical connection to a motor controller of the vehicle, the method comprising disconnecting the key-operated electrical power system from the electrical power supply of the vehicle; disconnecting the key-operated electrical power system from the motor controller of the vehicle; providing a control module of the keyless activation system, wherein the control module includes an electrical input, an electrical output, a switch electrically connected between the electrical input and the electrical output, and a signal receiver electrically connected to the switch, wherein the switch has an active configuration in which electrical power passes from the electrical input to the electrical output via the switch, and an inactive configuration in which the switch isolates the electrical output from the electrical input, and the configuration of the switch is controlled by signals from the signal receiver; connecting the power supply of the vehicle to an electrical input of a control module; connecting an electrical output of the control module to the motor controller of the vehicle; and pairing a remote operation transmitter to the control module.

It will be appreciate that the method of the second aspect of the invention relates to the retro-fitting of a keyless activation system to a powered mobility vehicle which was originally fitted with a key-operated power system.

In an embodiment of the invention, the operation of the remote operation transmitter moves the switch from the inactive configuration to the active configuration.

The remote operation transmitter suitably includes at least one button and operation of the transmitter comprises pressing the button.

Alternatively, the operation of the transmitter may include locating the transmitter within a pre-defined distance from the signal receiver.

In an embodiment of the invention, the remote operation transmitter transmits an operation signal and when the transmitter is in range of the signal receiver, the signal receiver urges the switch into its active configuration and when the transmitter is out of range of the signal receiver, the switch is urged into its inactive configuration.

The optional features described above in connection with the first aspect of the invention apply equally to the second aspect of the invention. Thus, the keyless activation system of the second aspect of the invention may include any of the optional features discussed herein in connection with the first aspect of the invention.

The skilled person will appreciate that the terms "electrically connected", "connected" and similar terms as used herein in the context of the subject invention include both direct connections and indirect connections via intermediate components. Thus, if component A is electrically connected to component B, they may be directly connected or they may be connected via one or more intermediate components C.

The skilled person will appreciate that the features described and defined in connection with the aspect of the invention and the embodiments thereof may be combined in any combination, regardless of whether the specific combination is expressly mentioned herein. Thus, combinations of optional features described and discussed herein are within the scope of the invention.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENTS

For the avoidance of doubt, the skilled person will appreciate that in this specification, the terms "up", "down", "front", "rear", "upper", "lower", "width", "above", "below", etc. refer to the orientation of the components of the invention when installed for normal use as shown in the FIGURE.

Figure 1:
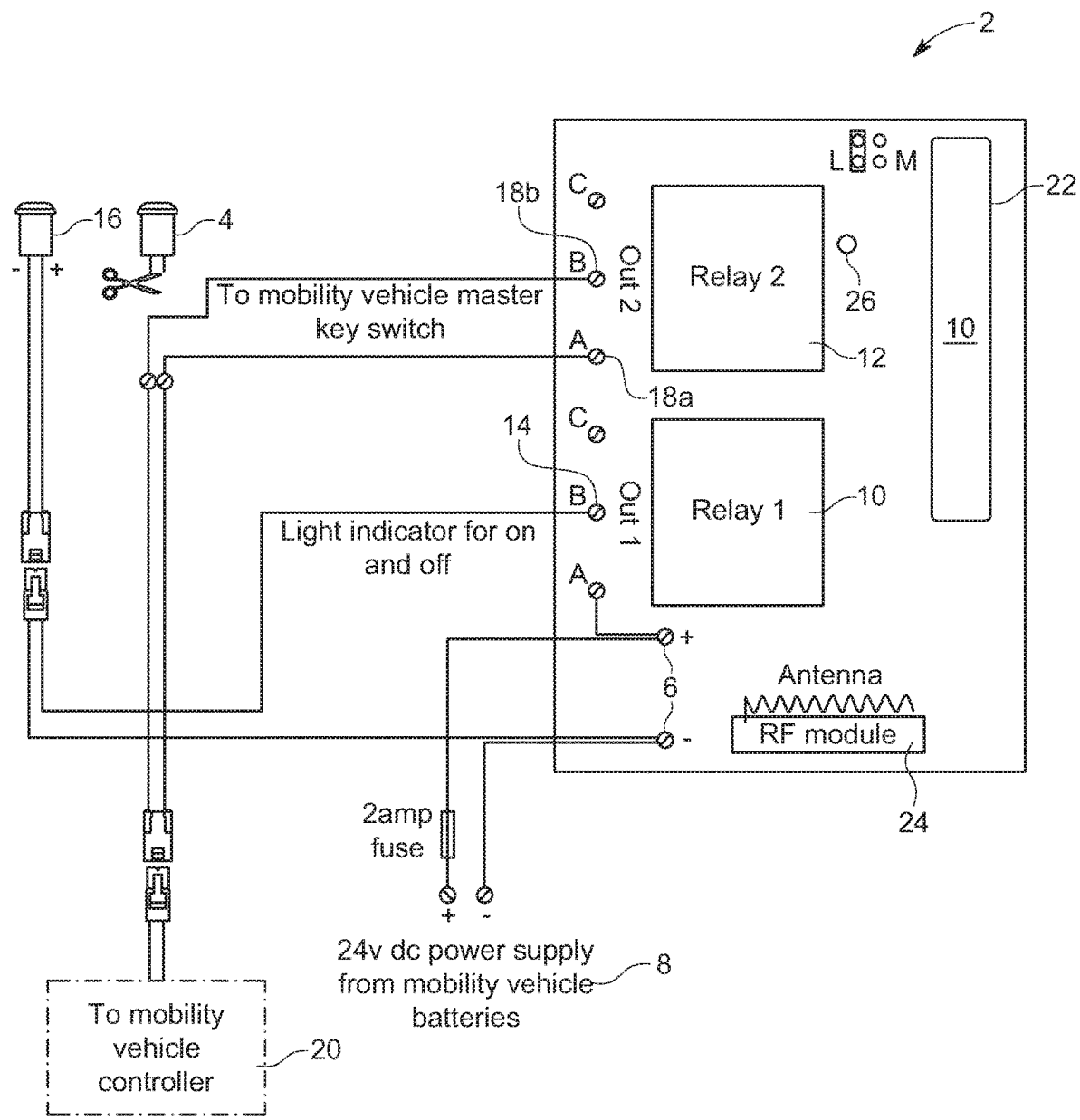
FIG. 1 is a schematic representation of a control module according to the invention replacing a conventional key-operated switch.
Figure 2:
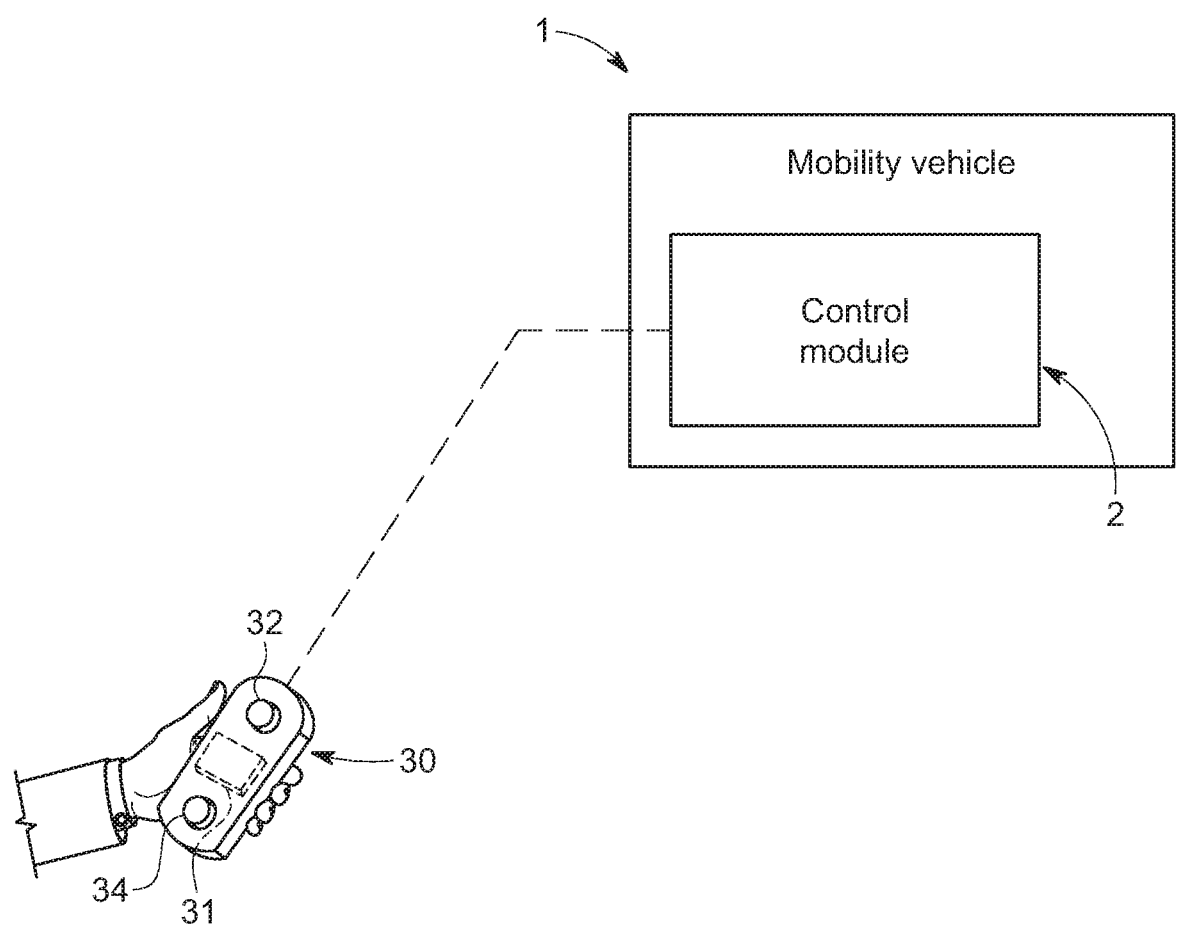
FIG. 2 is a schematic representation of a remote transmitter wirelessly coupled to a mobility vehicle.

FIG. 1 shows schematically a control module 2 which replaces a conventional key-operated switch 4 in an electrically powered mobility vehicle 1.

The control module 2 includes an electrical power input 6 which is connected to a 24V DC electrical power supply 8 which powers the mobility vehicle. The power supply 8 is in the form of a 24V rechargeable battery system (not shown in detail).

Two relay switches 10, 12 are provided in the control module 2. The first relay switch 10 has an electrical output 14 which is connected to an LED light 16, and the second relay switch 12 has an electrical output 18a, 18b, which is electrically connected to a power controller 20 of the mobility vehicle. When the relay switches 10, 12 are activated, electrical power from the 24V power supply 8 is connected to the power controller 20 and to the LED light 16. When the relay switches 10, 12 are in an inactive configuration, the LED light 16 and the vehicle power controller 20 are isolated from the electrical power supply 8. Accordingly, the vehicle is non-operable when the relay switches 10, 12 are in their inactive configuration and this is indicated by the absence of a light output from the LED light 16.

The first and second relay switches 10, 12 are controlled by control signals from an integrated circuit 22. The integrated circuit 22 receives inputs from a radio frequency receiver 24, compares the signal received by the receiver 24 to data stored on a memory to confirm that the signal is an authorised signal and then outputs a control signal to the relay switches 10, 12.

To retrofit the control module 2 in a conventional mobility vehicle, the key-operated switch 4 is disconnected from the power supply 8 and the vehicle power controller 20 and removed from the vehicle. The LED light 16 is then installed at the location on the vehicle which carried the key-operated switch 4. The control module 2 is fixed to the vehicle at a suitable location, the electrical input 6 is connected to the vehicle power supply 8, the first relay switch 10 is electrically connected to the LED light 16 and the second relay switch 12 is electrically connected to the vehicle power controller 20.

A remotely operated radio transmitter 30 is then paired with the control module 2 via a programming button 26. The pairing of a remote transmitter 30 with a radio frequency receiver is well known and will not be described in further detail herein. Once paired, the integrated circuit 22 is able to recognise the coded radio signal transmitted by the remote transmitter as an authorised signal and configures the relay switches 10, 12 accordingly.

In this embodiment, the remotely operated radio transmitter includes a first button 32 which switches on (i.e. activates) the mobility vehicle 1 and a second button 34 which switches off (i.e. disables) the mobility vehicle 1. Thus, when the first button 32 is pressed, a first signal is transmitted by a radio transponder 31 of the transmitter 30 and received by the radio frequency receiver 24. The radio frequency receiver 24 sends a first signal to the integrated circuit 22 which corresponds to the received signal and the integrated circuit 22 compares the received signal to the authorised signals that were stored in its memory during the pairing process. If the received signal is determined by the integrated circuit 22 to be an authorised "on" signal, the integrated circuit 22 sends control signals to the first and second relay switches 10, 12 which configures the relay switches 10, 12 in their active configurations, wherein they electrically connect the vehicle power controller 20 and the LED light 16 to the vehicle power supply 8.

When the second button 34 is pressed, a second signal is transmitted by the radio transponder 31 of the transmitter 30 and received by the radio frequency receiver 24. The radio frequency receiver 24 sends a second signal to the integrated circuit 22 which corresponds to the received second signal and the integrated circuit 22 compares the received second signal to the authorised signals that were stored in its memory during the pairing process. If the received second signal is determined by the integrated circuit 22 to be an authorised "off" signal, the integrated circuit 22 sends control signals to the first and second relay switches 10, 12 which configures the relay switches 10, 12 in their inactive configurations, wherein the vehicle power controller 20 and the LED light 16 are isolated from the vehicle power supply 8.

The skilled person will appreciate that the control module 2 may instead be configured to detect automatically the remote transmitter when it is in range of the signal receiver 24.

The skilled person will further appreciate that while the embodiment described above relates to the retro-fitting of the keyless activation system to an existing mobility vehicle, a further embodiment of the invention includes a powered mobility vehicle in which the keyless activation system is installed as part of the original equipment at manufacture. In a yet further embodiment, the keyless activation system is installed on an electrically powered mobility vehicle which does not include a key-operated activation system.

The invention claimed is:

1. An electrically powered mobility vehicle including a keyless activation system, wherein mobility vehicle includes an electrical power source and an electric motor which drives at least one wheel of the vehicle, the electric motor being controlled by a motor controller; the keyless activation system includes a control module carried by the vehicle and a remote operation transmitter, wherein the control module includes an electrical input which is electrically connected to the electrical power source of the vehicle, an electrical output electrically connected to the motor controller of the vehicle, a signal-operated switch electrically connected between the electrical input and the electrical output, and a signal receiver electrically connected to the switch, wherein the switch has an active configuration in which electrical power is supplied to the electrical output from the electrical input via the switch and an inactive configuration in which the switch electrically isolates the electrical output from the electrical input; and the configuration of the switch is controlled by signals from the signal receiver; and wherein the transmitter communicates wirelessly with the signal receiver; and wherein the transmitter includes a radio transponder which is paired with the signal receiver and which transmits an activation signal in response to a pairing signal emitted by the signal receiver such that when the transmitter is less than a pre-defined distance from the signal receiver, the signal receiver detects the activation signal transmitted by the transmitter.

2. A powered mobility vehicle according to claim 1, wherein the transmitter transmits an activation signal and the signal receiver configures the switch in the active configuration in response to the activation signal.

3. A powered mobility vehicle according to claim 2, wherein the transmitter includes at least one button that is pushed by a user to transmit an activation signal to the signal receiver.

4. A powered mobility vehicle according to claim 3, wherein the transmitter includes at least one second button that transmits a deactivation signal and the signal receiver configures the switch in the inactive configuration in response to the deactivation signal.

5. A powered mobility vehicle according to claim 1, wherein the switch is configured in the inactive configuration when the signal receiver is unable to receive the activation signal.

6. A powered mobility vehicle according to claim 1, wherein the vehicle includes a visual indicator connected to the electrical output of the control module and the visual indicator indicates the configuration of the switch.

7. A powered mobility vehicle according to claim 6, wherein the visual indicator is a light emitting element, wherein the light emitting element emits a light when the switch is in the active configuration.

8. A method of installing a keyless activation system in an electrically powered mobility vehicle, wherein the vehicle includes an electrical power source, an electric motor which drives the vehicle, a motor controller which controls the electric motor and a key-operated switch which controls the electrical connection of the motor controller to the electrical power source, the method comprising disconnecting the key-operated switch from the electrical power source of the vehicle; disconnecting the key-operated switch from the motor controller of the vehicle; providing a control module of the keyless activation system, wherein the control module includes an electrical input, an electrical output, a signal-operated switch electrically connected between the electrical input and the electrical output, and a signal receiver electrically connected to the switch, wherein the switch has an active configuration in which electrical power passes from the electrical input to the electrical output via the switch, and an inactive configuration in which the switch isolates the electrical output from the electrical input, and the configuration of the switch is controlled by signals from the signal receiver; electrically connecting the electrical power source of the vehicle to an electrical input of the control module; electrically connecting an electrical output of the control module to the motor controller of the vehicle; and pairing a remote operation transmitter to the control module, and wherein the remote operation transmitter transmits an operation signal in response to a pairing signal emitted by the signal receiver, and when the transmitter is in range of the signal receiver, the signal receiver urges the switch into its active configuration, and when the transmitter is out of range of the signal receiver, the switch is urged into its inactive configuration.

9. A method according to claim 8, wherein a first operation of the operation of the remote operation transmitter transmits a first operative signal to the signal receiver and the signal receiver transmits a signal to the switch in response to the first operative signal which causes the switch to move from its inactive configuration to its active configuration.

10. A method according to claim 9, wherein the remote operation transmitter includes a first button and the first operation of the transmitter comprises pressing the first button.

11. A method according to claim 10, wherein a second operation of the remote operation transmitter transmits a second operative signal to the signal receiver and the signal receiver transmits a second signal to the switch in response to the second operative signal which causes the switch to move from its active configuration to its inactive configuration.

12. A method according to claim 11, wherein the remote operation transmitter includes a second button and the second operation of the transmitter comprises pressing the second button.

\* \* \* \* \*